Feb. 24, 1959     S. J. BUTKEVICH     2,874,498
PHOTOGRAPHIC SLIDE PROTECTOR
Filed Nov. 29, 1954
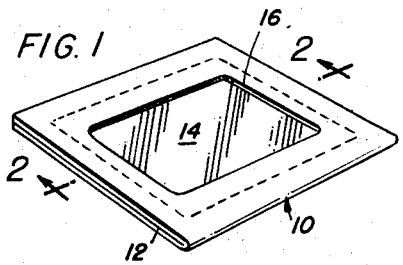
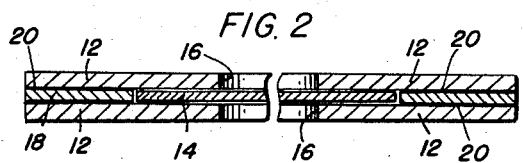
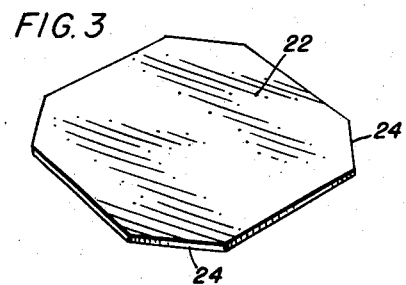
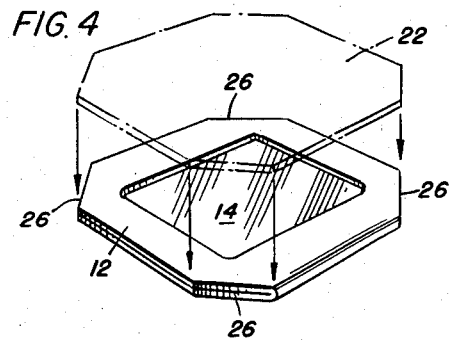
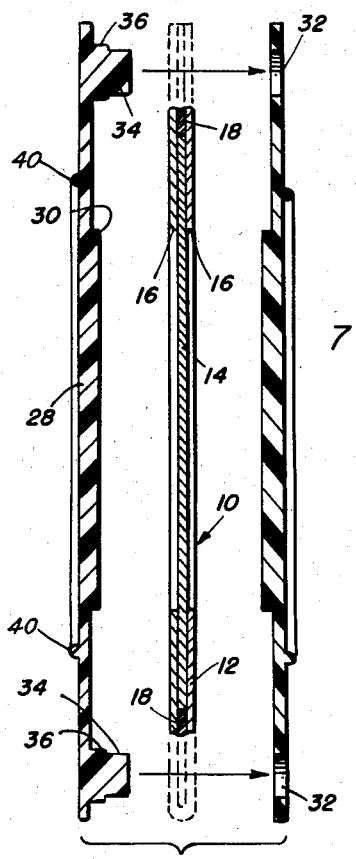
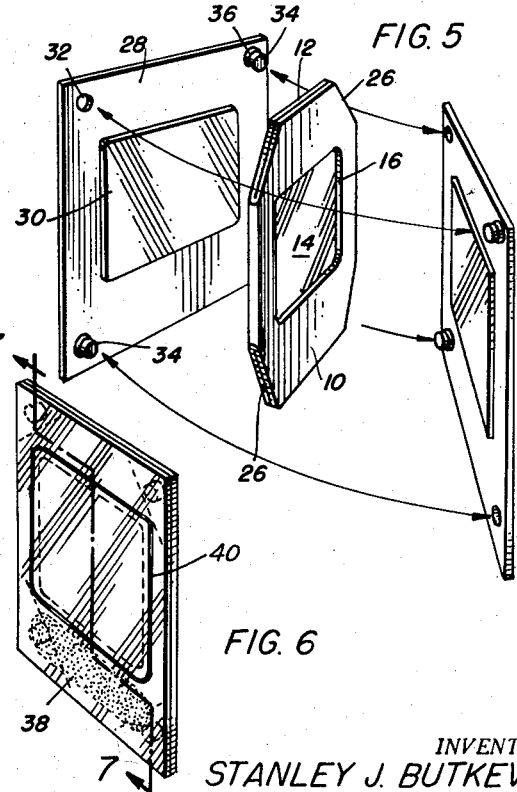
INVENTOR:
STANLEY J. BUTKEVICH
BY
ATT'Y United States Patent Office 2,874,498
Patented Feb. 24, 1959

2,874,498

PHOTOGRAPHIC SLIDE PROTECTOR

Stanley J. Butkevich, Chicago, Ill., assignor to Admiral Photo Products Co., Chicago, Ill., a corporation of Illinois Application November 29, 1954, Serial No. 471,795

4 Claims. (Cl. 40—152)

This invention relates in general to a protector for a photographic slide, and consists in modifying the ordinary photographic slide so that it may be encased in a protective, plastic or other covering to preserve the slide without interfering with the showing or reproduction of the slide.

Photographic slides of this type usually comprise a thin film section which is suitably enclosed between opposite portions of a marginal cover gripping the marginal edges of the film, but leaving the central portion unobstructed and uncovered at the opposite sides thereof. This makes it possible to scratch, dent or spill some material upon the exposed material of the film and thus to damage or destroy the slide. The present invention provides a cover to enclose the slide to protect and overlie the opposite surfaces of the film and to add nothing to the size of the slide thus covered except a slight thickness which is not detrimental as the protected slides may be included in the same carriers now commonly provided for slides of this size.

An important object of the invention is to provide a new and improved cover for entirely enclosing the slide which extends also over the opposite surfaces of the film thereof.

A further object of the invention is to provide a protector which adds nothing in size to the rectangular dimensions of the slide, but only increases the thickness thereof.

A further object of the invention is to provide a protector for a photographic slide which is composed of similar pieces oppositely applied to reduce the number of different pieces necessary to make a complete protector.

Still a further object of the invention is to provide an entirely roughened surface or a roughened area upon the cover for applying a description or title to the particular view shown by the slide.

Another object of the invention is to contact both sides of the film to prevent it from distorting under heat.

Other objects of the invention will appear in the specification and will be apparent from the accompanying drawings in which, Fig. 1 represents a perspective view of a common type of photographic slide having a foldable cardboard cover.

Fig. 2 is a sectional view as taken on the line 2—2 of Fig. 1 showing the ordinary disposition and relative thicknesses of the parts of the slide in an enlarged section.

Fig. 3 is a perspective view of a templet for clipping the corners of the slide of Fig. 1.

Fig. 4 illustrates the application of the pattern for clipping the sides.

Fig 5 shows a perspective view of a slide with clipped corners to which a protective covering in accordance with this invention is applied around the corners thereof.

Fig. 6 is a perspective view of a slide as shown in Fig. 5 with the covers applied thereto; and Fig. 7 is an exploded sectional view as taken on the line 7—7 of Fig. 6, showing the parts substantially in their proper proportions to enclose and protect the film in its holder.

In carrying out the method of use and application of the present invention, a photographic slide to be protected is first clipped at the corners in accordance with a templet provided as a guide and two covers of the same construction which match with each other are applied at opposite sides of the slide, the corresponding corners having interengaging parts which extend around the cut extremities of the slide, the covers being provided with projections which set in the slide openings at opposite sides thereof to prevent relative movement of the slide and also to close tightly upon it to prevent accumulation of dust, dirt, or foreign material which might otherwise tend to obscure the picture.

Referring now more particularly to the drawings, a photographic slide 10 has an outer cover 12 folded over a film 14 with opposite openings 16 through which the film may be displayed. Between the opposite sections of the cover is a thin marginal frame 18 of substantially the same thickness of the film 14 and attached to one or both of the cover sections by an adhesive 20. With the film in this cover, the opposite surfaces of the film are not protected as they may be engaged through the openings 16 and it is a particular object of the present invention to provide means for enclosing the cover protecting the film therein.

Most of the photographic slides as 10 are substantially square with rectangular picture openings 16 therein so that by applying a templet 22 having angularly removed corner portions 24 to a slide 10, the corners of the slide may be correspondingly cut away and removed, leaving angular surfaces 26 at the corners.

In order to engage and to suitably enclose the photographic slide, a plurality of similar protector plates 28 are provided, each substantially square having a projection in the form of a rectangular thickened portion 30 at one side substantially equal to the thickness of the material of the cover 12 of a slide so that this projection may extend inwardly at each side of a slide as shown in Fig. 5 to be seated in each of the opposite recesses and to contact with the adjacent face of the film 14, to keep it clean and prevent distortion by heat.

Two opposite corners of each plate 28 have corner holes 32 and the other intermediate corners of the plate have corner posts 34 of a size at the outer portion thereof to extend through and provided with inner enlarged portions which constitute annular spacer members 36 of a slightly larger diameter and a width or height substantially equal to the thickness of the photographic slide which is covered thereby.

With this construction, two outer plates are applied to the outer sides of a slide to be protected by rotating one of the plates 180° with respect to the other which will bring the posts 34 of one plate opposite the holes 32 of the other plate. When the plates are thus applied to the opposite sides of a slide, the posts 34 will frictionally engage in the openings 32 but they will be limited in their movement together by an annular spacer member 36 at the base of each post 34.

The frictional engagement of the posts 34 with the holes 32 is usually sufficient to hold the plates in their protective position at the opposite sides of the slides, but if desired, an adhesive may be applied to the projections 34 or the openings 32 to secure them more firmly together. When the posts 34 are received within the openings 32, the flat distal ends thereof lie flush with the outside faces of the plates 28 so that these latter surfaces are substantially smooth throughout. A limited portion 38 of the outer surface of one of the plates 28 may be roughened to facilitate application thereto of suitable identifying indicia (not shown) utilizing a pencil or the like for this purpose.

At the outer side of each protector plate 28 and preferably entirely surrounding the transparent projection 30 at the inner side of the plate, is a protective bead 40 which prevents scratching of the clear area oppposite a picture when a slide protector is inserted into or removed from a projector. It also protects the area within the bead from scatching or damage when slides are inserted together in a container. The bead is so small that it does not add appreciably to the thickness of the protector, but still adds a material amount of protection for the surface of the protector plate which is opposite the picture.

With this construction, the slide is covered and protected so that there is no danger of damage to the surface of the film nor danger of warping due to heat as the film surfaces are supported by contact, and the cover plates may be permanently attached thereto if desired or may be disengaged by inserting a thin instrument such as a knife blade between the edges of the plates, if desired.

While I have thus described my invention in some detail, it should be regarded by way of illustration and example rather than as a restriction or limitation of the invention as various changes may be made in the construction, combination and arrangement of the parts without departing from the spirit and scope of the invention.

I claim:

1. A protector for use with a photographic film slide having an outer cover extending over both sides of the film, said cover being provided with picture openings on opposite sides of the film through which the film is visible, said protector comprising a pair of plates each having a generally rectangular transparent thickened portion projecting outwardly beyond one face thereof, said plates being adapted to enclose the film slide therebetween in sandwich fashion with the thickened portions extending into said openings on opposite sides of the film respectively and substantially filling the same whereby the film is tightly sealed between said thickened portions in face-to-face contact therewith, each plate being provided with cylindrical posts at one pair of diagonally opposite corners and with circular holes at the other pair of diagonally opposite corners to receive the posts of the opposed plate, the plates being of the same overall rectangular dimensions of the film slide and the slide being truncated at its corners to provide clearance regions so that the posts may interengage with their respective holes in the corner regions of the protector, each plate being further provided with continuous spacer members at one of said pairs of diagonally opposite corners, said spacer members being of a thickness substantially equal to the overall thickness of the slide and presenting outwardly facing flat surfaces which, when the posts are received within their respective holes, surround the posts and bear against the opposing face of the other plate to limit the extent of reception of the posts into the holes.

2. A film slide protector as set forth in claim 1, including, additionally, integral projecting beads formed on the plates on the sides thereof opposite the transparent thickened portions, said thickened portions lying wholly within the lateral projecting confines of the beads whereby the faces of the plates within the confines of the beads are protected from abrasion by similar protectors and a plurality of the protectors are arranged in stacked relationship.

3. A protector for use with a photographic film slide wherein the film is sandwiched within a paper folder which is folded around an edge of the film and has side wings overlying the opposite sides of the film respectively, each side wing being formed with a central rectangular opening therethrough centered over the film and through which openings the film is visible, and a marginal liner of a thickness substantially equal to the thickness of the film interposed between said side wings and surrounding the film, said protector comprising a pair of identical plates each having a generally rectangular transparent thickened portion projecting outwardly beyond one face of the plate, said plates being adapted to enclose the film slide therebetween with the thickened portions extending into said openings on opposite sides of the film respectively and substantially filling the same whereby the film is tightly sealed between said thickened portions in face-to-face contact therewith, each plate being provided with posts at one pair of diagonally opposite corners and with holes at the other pair of diagonally opposite corners to receive the posts of the opposed plate, the plates being of the same overall rectangular dimensions as the rectangular dimensions of the film slide and the slide being truncated at its corners to provide clearance regions so that the posts may interengage with their respective holes in the corner regions of the protector, said posts being formed with enlargements at the bases thereof presenting outwardly facing annular shoulders designed for engagement with the faces of the opposed plate, said enlargements constituting spacer members and the thickness thereof being substantially equal to the thickness of the slide to limit the extent of proximity of the plates when the latter are assembled upon the photographic slide.

4. A protector for use with a photographic film slide wherein the film is sandwiched within a paper folder which is folded around an edge of the film and has side wings overlying the opposite sides of the film respectively, each side wing being formed with a central rectangular opening therethrough centered over the film and through which openings the film is visible, and a marginal liner of a thickness substantially equal to the thickness of the film interposed between said side wings and surrounding the film, said protector comprising a pair of identical plates each having a generally rectangular transparent thickened portion projecting outwardly beyond one face of the plate, said plates being adapted to enclose the film slide therebetween with the thickened portions extending into said openings on opposite sides of the film respectively and substantially filling the same whereby the film is tightly sealed between said thickened portions in face-to-face contact therewith, each plate being provided with posts at one pair of diagonally opposite corners and with holes at the other pair of diagonally opposite corners to receive the posts of the opposed plate, the plates being of the same overall rectangular dimensions as the rectangular dimensions of the film side and the slide being truncated at its corners to provide clearance regions so that the posts may interengage with their respective holes in the corner regions of the protector, and spacer means surrounding the posts for maintaining said plates spaced apart a distance equal to the overall thickness of the film slide.

References Cited in the file of this patent

UNITED STATES PATENTS

| | | |
|---|---|---|
| 959,249 | Nielson | May 24, 1910 |
| 1,322,380 | Watts | Nov. 18, 1919 |
| 2,432,515 | De Sherbinin | Dec. 16, 1947 |
| 2,490,058 | Jablon | Dec. 6, 1949 |
| 2,496,008 | Jablon | Jan. 31, 1950 |
| 2,505,250 | Kime | Apr. 25, 1950 |
| 2,527,765 | Roehrl | Oct. 31, 1950 |